Oct. 14, 1958  E. L. VAN DEREN  2,855,876
SEED PLANTING MACHINE
Filed June 8, 1956  2 Sheets-Sheet 1
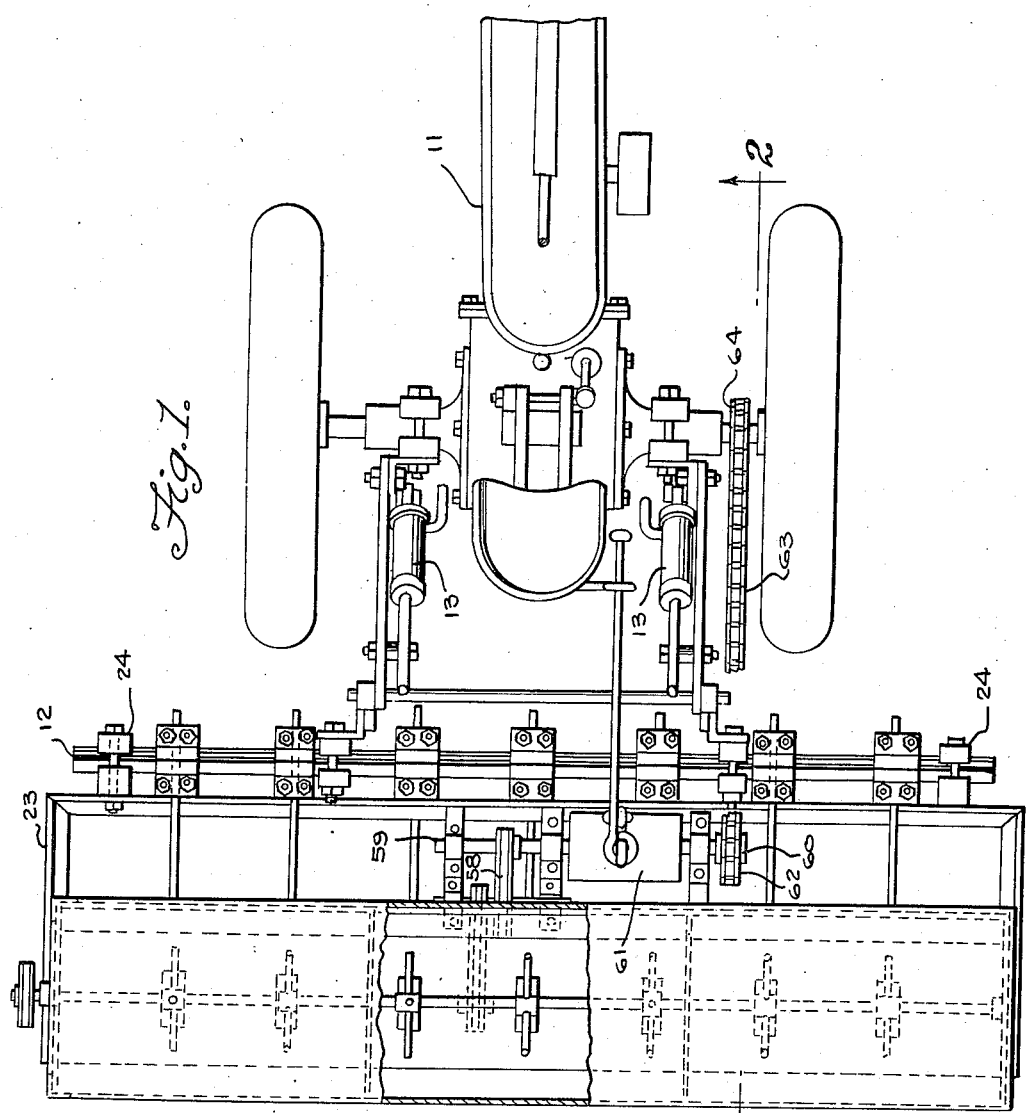
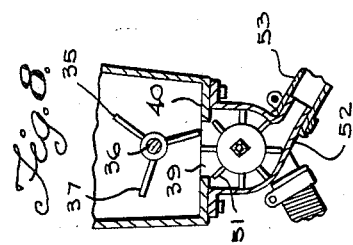
INVENTOR.
Earl L. VanDeren,
BY
McMorrow, Berman + Davidson
ATTORNEYS Oct. 14, 1958  E. L. VAN DEREN  2,855,876
SEED PLANTING MACHINE
Filed June 8, 1956   2 Sheets-Sheet 2
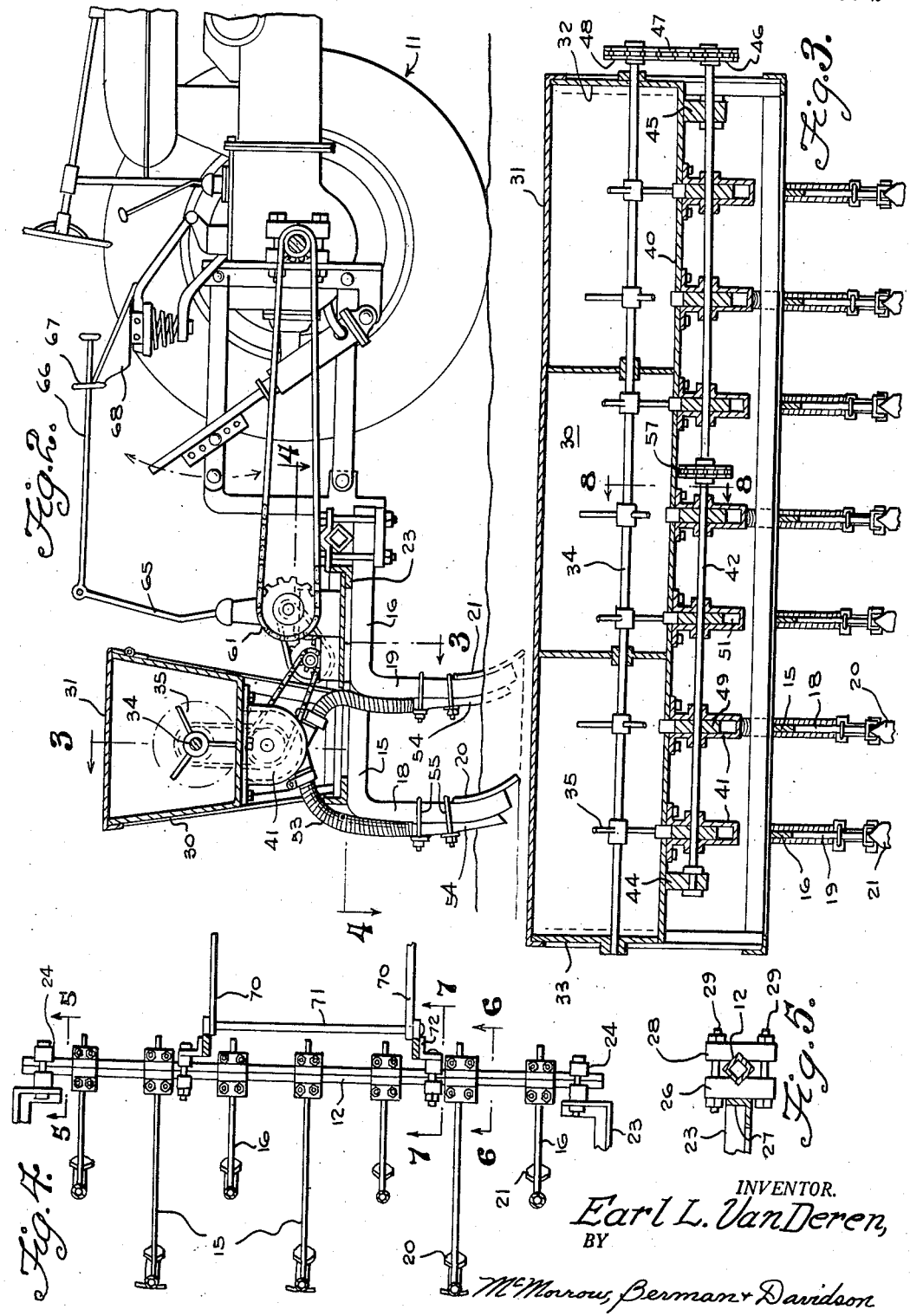
INVENTOR.
Earl L. VanDeren,
BY
McMorrow, Berman + Davidson
ATTORNEYS

United States Patent Office 2,855,876
Patented Oct. 14, 1958

2,855,876

SEED PLANTING MACHINE

Earl L. Van Deren, Sedona, Ariz.

Application June 8, 1956, Serial No. 590,183

2 Claims. (Cl. 111—52)

This invention relates to seed planting machines, and more particularly to a seed planter adapted to be mounted on the rear portion of a farm tractor.

The main object of the invention is to provide a novel and improved seed planting machine adapted to be mounted on the tool bar of a conventional farm tractor and to operate in association with the ground-engaging ripper bars associated with the tractor tool bar, the machine being simple in construction, being easy to install, and providing efficient distribution of seed.

A further object of the invention is to provide an improved planting machine of the type adapted to be mounted on the rear portion of a tractor, and to be secured to the tool bar of the tractor, the machine being inexpensive to manufacture, being rugged in construction, and being completely automatic in operation, the machine being arranged so that the seed therefrom is distributed in the furrows created by the ripper elements of the tool bar of the tractor without waste or unnecessary scattering of the seed.

Further objects and advantages of the invention will become apparent from the following description and claims, and from the accompanying drawings, wherein:

Figure 1 is a top plan view, with parts broken away, showing a conventional farm tractor on which is mounted a seeding machine constructed in accordance with the present invention.

Figure 2 is a vertical longitudinal cross sectional view taken on the line 2—2 of Figure 1.

Figure 3 is a vertical transverse cross sectional view taken on the line 3—3 of Figure 2.

Figure 4 is a horizontal cross sectional view taken on the line 4—4 of Figure 2.

Figure 5 is an enlarged cross sectional detail view taken on the line 5—5 of Figure 4.

Figure 6 is an enlarged cross sectional detail view taken on the line 6—6 of Figure 4.

Figure 7 is an enlarged cross sectional detail view taken on the line 7—7 of Figure 4.

Figure 8 is a cross sectional detail view taken substantially on the line 8—8 of Figure 3.

Referring to the drawings, 11 designates a conventional farm tractor provided with a transversely extending tool bar 12 attached to the rear portion of the tractor in a conventional manner and being square in transverse cross section, as is clearly shown in Figure 5. The transverse tool bar 12 is connected to the tractor in the manner illustrated in Figure 1, and is arranged so that it may be raised and lowered by the tractor hydraulic cylinders 13, as required.

Secured to the tool bar 12 in a conventional manner are the spaced relatively long, rearwardly extending ripper bars 14, and secured to the tool bar in alternate relation with the lower ripper bars 15 are the relatively short ripper bars 16 spaced between adjacent pairs of ripper bars 15, as shown in Figure 4. The ripper bars 15 and 16 are provided with the depending end portions, shown respectively at 18 and 19 in Figure 2, said depending portions 18 and 19 being provided at their lower ends with the ground-engaging blades 20 and 21 adapted to form furrows in the ground responsive to the forward movement of the tractor 11.

Designated at 23 is an elongated generally rectangular frame which is slightly longer than the tool bar 12, as shown in Figure 1, said frame being disposed on the horizontal top portions of the ripper bars 15 and 16 and being secured to the tool bar 12 in spaced parallel relationship thereto, as is clearly shown in Figure 1, as by clamping assemblies 24, 24 provided at the opposite end portions of one longitudinal side of frame 23, and clampingly engaging the respective opposite end portions of the tool bar 12, as is clearly shown in Figures 1 and 4. As shown in Figure 5, each clamping assembly 24 comprises a rear vertical bar 26 rigidly secured to the longitudinal frame element 27, as by welding or the like, and a vertical clamping block 28 connected to the block 26 by a pair of bolts 29, 29 disposed above and below the tool bar 12 which is received between the blocks 26 and 28 in opposing V-shaped notches provided in said blocks.

Secured on the rear portion of the frame 23 is the transversely extending seed box 30 which is substantially coextensive with the frame 23, as shown in Figure 1, and which is provided with the hinged top cover 31.

Journaled in the seed box 30 and extending rotatably through the end walls 32, 33 thereof is the rotary agitator shaft 34 which is provided with the spaced radially toothed agitator assemblies 35 secured thereon, as shown in Figure 3. Each assembly 35 comprises a hub portion 36 to which is secured a plurality of outwardly extending radial agitator rods 37, as shown in Figure 8, said rods being of substantial length and the shaft 34 being located in the lower portion of the box so that as the shaft rotates the rods 37 agitate the seed in said lower portion. Each agitator assembly 35 is located over a discharge opening 39 provided in the bottom wall 40 of the seed box, said opening 39 comprising a slot leading to a discharge housing 41 secured to the bottom wall in depending relationship thereto, a discharge housing 41 being associated with each discharge slot 39. As shown in Figure 8, the discharge housings 41 have substantially arcuate lower portions. A transverse shaft 42 extends rotatably through the respective discharge housings 41, said shaft being journaled at one end in a depending bearing block 44 secured to the bottom wall 40 of the seed box and at its other end being journaled in a similar depending bearing block 45 secured to said bottom wall, the shaft extending outwardly beyond said bearing block, as shown in Figure 3, and being provided at its end with a sprocket wheel 46 which is coupled by a sprocket chain 47 to a similar sprocket wheel 48 secured on the end of the agitator shaft 34.

Secured on the shaft 42 in the respective housings 41 are the metering discs 49 provided with the radially extending discharge blades 51 which substantially engage the inside wall surfaces of the arcuate lower portions of the discharge housings 41, as shown in Figure 8. Each discharge housing 41 is provided at its lower portion with a discharge conduit portion 52 to which is connected the top end of a flexible hose 53. Secured to the lower portions of the respective depending ripper bar members 18 and 19 rearwardly thereof are the respective rigid discharge tubes 54. The lower end of each flexible hose 53 is connected to the top end of a respective rigid discharge tube 54, whereby seed will be discharged rearwardly adjacent each of the blades 20 and 21 as said blades move through the soil, the lower ends of the discharge tubes 54, 54 being located relatively close to the lower ends of the depending ripper bar portions 18 and 19, whereby the seeds will be accurately deposited in the furrows created by the blades 20 and 21.

As shown in Figure 2, the discharge tubes 54 are fastened on the depending ripper bar portions 18 and 19 by U-bolts 55, or similar readily adjustable fastenings, whereby the positions of the discharge tubes 54 relative to the lower ends of the depending ripper bar portions 18 and 19 may be readily adjusted, as required.

Secured to the intermediate portion of the rotary shaft 42 is a sprocket wheel 57 which is coupled by a sprocket chain 58 to a transverse shaft 59 driven from a transverse shaft 60 through a conventional speed selecting transmission unit 61 mounted on the frame 23. The shafts 59 and 60 are suitably journaled in bearing means mounted on said frame, as shown in Figures 1 and 2. The shaft 60 is provided with a sprocket wheel 62 which is coupled by a sprocket chain 63 to a sprocket wheel 64 secured on the rear axle of the tractor, whereby the agitator shaft 34 and the metering shaft 42 rotate simultaneously with the rear axle of the tractor at a speed determined by the setting of the transmission unit 61. The transmission unit 61 is provided with a control lever 65 which is connected to a control rod 66 slidably supported in a bracket 67 connected to the rear portion of the driver's seat 68 of the tractor. Thus, as shown in Figure 2, the transmission unit 61 may be controlled by the driver from the rear seat of the tractor by means of the control rod 66.

In operation, as the tractor moves forwardly along its course of travel, the agitator shaft 34 and the metering shaft 42 rotate simultaneously, causing the seed to be discharged through the lower outlet conduit 52 of the discharge housing 41 and through the flexible conduit 53 to the respective seed discharge tubes 54.

Since the discharge tubes 54 are located rearwardly adjacent the furrowing blades 20 and 21, the seed is deposited directly into the furrows formed by said blades, since, as shown in Figure 2, the lower ends of the tubes 54 are located at a sufficient depth in the furrows created by the blades 20 and 21 to prevent the seed from being scattered or deviated from the furrows. As above explained, the tubes 54 are adjustable, so that they may be adjusted to terminate at any desired depth in the furrows, to regulate the manner in which the seed is spread in the furrows.

As will be seen from Figures 4 and 7, the tool bar 12 is pivotally connected in a conventional manner to the tractor hitch structure comprising the longitudinal bars 70, 70 and the transverse bar 71 by hinge brackets 72, 72 which are clamped to the tool bar 12, as by the clamping blocks 73, 74 and the clamping bolts 75, 75, shown in Figure 7.

While a specific embodiment of an improved seeding machine has been described in the foregoing description, it will be understood that various modifications within the spirit of the invention may occur to those skilled in the art. Therefore, it is intended that no limitations be placed on the invention except as defined by the scope of the appended claims.

What is claimed is:

1. In a tractor, a transverse tool bar secured to the rear portion of the tractor, a plurality of spaced alternating long and short ripper bars secured to said tool bar, said ripper bars having horizontal top portions extending rearwardly from the tractor and having ground-engaging depending end portions, respective rigid seed tubes adjustably secured on said depending end portions, a transverse seed box mounted on said horizontal top portions of the ripper bars and having a plurality of depending seed meterings outlet housings connected to its bottom wall, said metering outlet housings having arcuate lower portions, rotary seed metering members mounted axially in said outlet housings and having radially extending blades substantially engaging the inside wall surfaces of said arcuate lower portions, a rotary agitator mounted in said seed box and extending transverse to the ripper bars, means drivingly coupling the agitator to the rotary seed metering members for simultaneous rotation therewith, common drive means coupling said agitator and rotary metering members to a rear wheel of the tractor, and respective flexible conduits connecting said outlet housings to said seed tubes.

2. In a tractor, a transverse tool bar secured to the rear portion of the tractor, a plurality of spaced alternating long and short ripper bars secured to said tool bar, said ripper bars having horizontal top portions extending rearwardly from the tractor and having ground-engaging depending end portions, respective rigid seed tubes adjustably secured on said depending end portions, a frame mounted transversely on said horizontal top portions of the ripper bars and extending parallel to said tool bar, an elongated seed box mounted on the rear portion of said frame parallel to said tool bar and being substantially coextensive in length therewith, said seed box having a plurality of depending seed metering outlet housings connected to its bottom wall, said metering outlet housings having arcuate lower portions, rotary seed metering members mounted axially in said outlet housings and having radially extending blades substantially engaging the inside wall surfaces of said arcuate lower portions, a rotary agitator mounted in said seed box and extending transverse to the ripper bars, means drivingly coupling the agitator to the rotary seed metering members for simultaneous rotation therewith, common drive means coupling said agitator and rotary metering members to a rear wheel of the tractor, and respective flexible conduits connecting said outlet housings to said seed tubes.

References Cited in the file of this patent

UNITED STATES PATENTS

| | | |
|---|---|---|
| 544,966 | Davis | Aug. 20, 1895 |
| 1,259,033 | Michel | Mar. 12, 1918 |
| 2,221,769 | Hipple | Nov. 19, 1940 |
| 2,410,937 | Harder | Nov. 12, 1946 |
| 2,626,579 | Shaw | Jan. 27, 1953 |
| 2,657,652 | Graham | Nov. 3, 1953 |

FOREIGN PATENTS

| | | |
|---|---|---|
| 166,932 | Australia | Oct. 14, 1954 |